INVENTOR
R. B. SLADEK
BY J. R. Hall
ATTORNEY

INVENTOR
R. B. SLADEK
BY J. R. Hall
ATTORNEY

May 3, 1960 R. B. SLADEK 2,935,570

TELEPHONE SYSTEMS

Filed Oct. 17, 1955 3 Sheets-Sheet 3

INVENTOR
R. B. SLADEK
BY J. W. Hall
ATTORNEY 2,935,570

TELEPHONE SYSTEMS

Robert B. Sladek, Cicero, Ill., assignor to Western Electric Company, Incorporated, New York, N.Y., a corporation of New York Application October 17, 1955, Serial No. 541,005

13 Claims. (Cl. 179—18)

This invention relates to telephone systems, and more particularly to step-by-step telephone systems.

Various step-by-step systems for double-hunting have been proposed in the past. However, in each of these systems, wiper switching relay action occurs after completion of the effective rotary step, which necessitates retarding the stepping speed of the rotary switch so as to prevent the rotary action from stepping the wipers off the desired terminals before operation of the wiper switching relay is completed. This requires a general slowing down of the rotary speed of the rotary switch and sometimes causes mutilation of the dialed digits under heavy traffic conditions due to the switch being unable to reach further trunks in the level prior to release of the dial for the succeeding digit by the calling subscriber.

An object of the invention is to provide telephone systems having double-hunting step-by-step switches.

Another object of the invention is to provide telephone systems having double-hunting step-by-step switches provided with pretesting wiper springs.

A further object of the invention is to provide telephone systems including step-by-step switches which simultaneously at high speed hunt along two groups of trunks.

A further object of the invention is to provide telephone systems having step-by-step switches wherein a pretest wiper spring hunts over even-numbered terminals and wherein a set of wiper springs hunt over odd-numbered terminals.

A telephone system illustrating certain features of the invention may include a switch having a first group of outgoing trunk terminals and a second group of outgoing trunk terminals. Two testing wipers hunt simultaneously over the groups of trunk terminals, and connect wipers to open trunks.

A telephone system forming a more specific embodiment of the invention may include a set of wipers normally hunting over odd-numbered trunk terminals and a pretest wiper normally hunting over trunk terminals one position in advance of the set of wipers. Rotary stepping means are provided to step the wipers two terminal positions each time both the trunks tested are busy, and serve to step the wipers only one position when the set of wipers test a busy trunk and the pretest wiper tests an open trunk one position in advance of the set of wipers.

A complete understanding of the invention may be obtained from the following detailed description of a telephone system forming a specific embodiment thereof, when read in conjunction with the appended drawings, in which.

Figure 1:
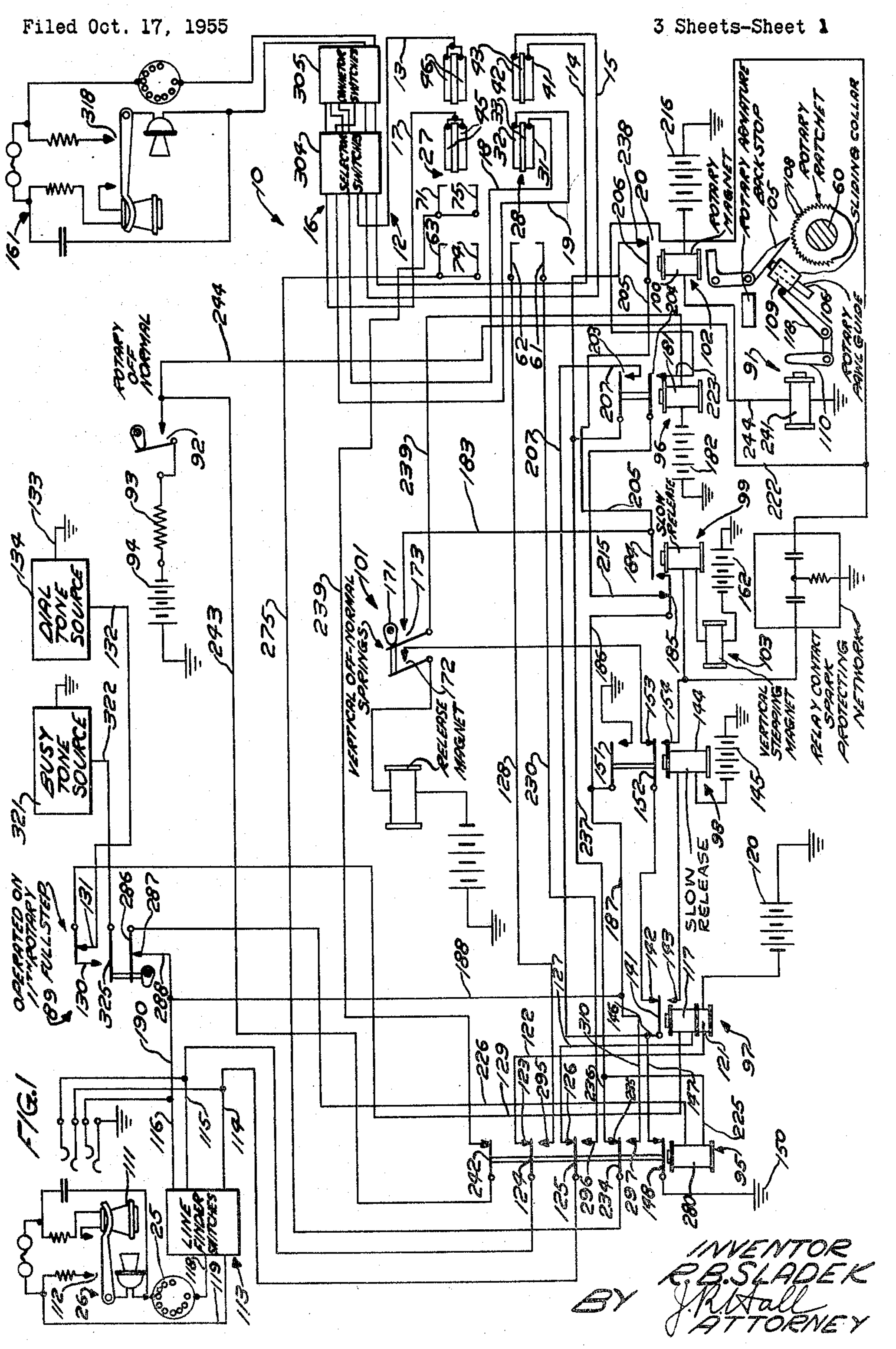
Fig. 1 is a diagrammatic view of a portion of a telephone system forming one embodiment of the invention.
Figure 2:
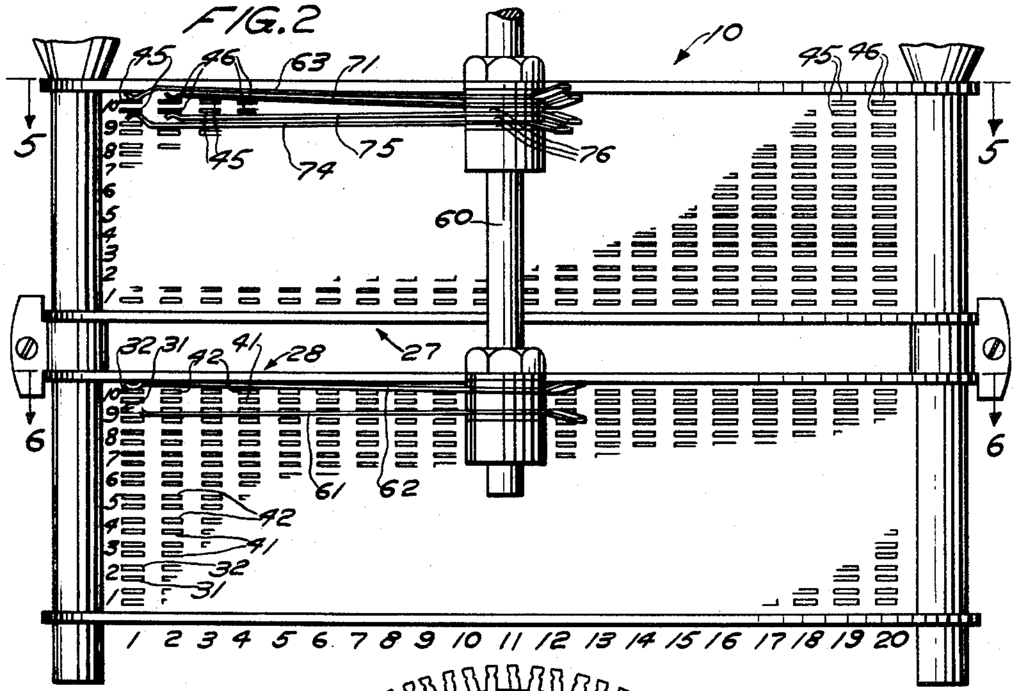
Fig. 2 is a fragmentary, front elevation of a portion of the switch forming a portion of the system shown in Fig. 1.

Referring now in detail to the drawings, there is shown therein a telephone system having a double-hunting step-by-step selector switch 10 applicable to step-by-step system dial telephone offices, Strowger System offices and other well known systems which are used in dial telephone offices. The switch 10 provides outgoing local and interoffice trunks with higher efficiency in traffic carrying capacity than hitherto known equipment. The switch hunts over a maximum number of even-numbered trunks 12, each consisting of a sleeve conductor 13, a tip conductor 14 and ring conductor 15, and odd-numbered trunks 16, each consisting of a sleeve conductor 17, a tip conductor 18 and a ring conductor 19, in the critically limited period of time available for trunk hunting.

The switch 10, in the system shown, hunts over a maximum of twenty trunks within the minimum period of time between receipt of the last impulse of an effective digit from a dial 25 of a calling station 26 and the release of the finger wheel of the dial for the next successive digit of the number being called. This gives an increase in the load carrying capacity of each trunk outgoing from its banks 27 and 28, since the load carrying capacity of a trunk in a group of twenty trunks is materially greater than that of a trunk in a group of ten trunks accessible to a hunting device in a single hunting trial due to the reduction of the idle time between calls while the trunk is waiting for reassignment. This results in a reduction of the total number of outgoing trunks required for a given traffic load with a savings in not only the quantity of trunks themselves but also in the associated apparatus such as terminating selectors and connectors in intra-office calls, out trunk switches, outgoing repeaters and incoming selectors in inter-office calls and trunk relay equipment and answering apparatus in special service, long distance operator and other service calls. The switch 10 is also suitable for use on the various types of digit-absorbing selectors.

The bank 28 has one hundred odd-numbered tip terminals 31, ten to a level, and one hundred odd-numbered ring terminals 32 insulated by insulating plates 33, each connected to a conductor of one hundred outgoing trunks 16. The bank 28 similarly is connected to a similar number of outgoing trunks 12 through one hundred even-numbered tip terminals 41 positioned between the terminals 31 and one hundred even-numbered ring terminals 42 insulated from the tip terminals 41 by insulating plates or blocks 43. The bank 27 includes one hundred odd-numbered sleeve terminals 45 spaced alternately between one hundred even-numbered sleeve terminals 46, the terminals 45 being connected to sleeve conductors of one hundred trunks 16, and the terminals 46 being connected to the sleeve conductors of the hundred trunks 12.

The switch 10 includes a rotatable and vertically movable shaft 60 of a well known type on which are mounted wipers or wiper springs 61, 62 and 63 for contacting the terminals 31, 32 and 45, respectively, and the terminals 41, 42 and 46, respectively. An advance or pretest wiper or wiper spring 71 located one position in advance of the sleeve or test wiper 63 contacts the terminals 46 one horizontal or rotary step in advance of the wiper spring 63, which engages the terminal 45, during each trunk-hunting operation. The spring 71 also is one terminal in advance of the wiper springs 61 and 62, which are always in the same rotary position as the spring 63. A wiper spring 75 is provided only to mechanically balance the spring 71, and a wiper spring 74 mechanically balances the spring 63. The springs 63 and 74 bracket the springs 71 and 75, are insulated from the latter springs by conventional insulating washers 76 and are spaced from the wiper springs 71 and 75. The wiper 71 serves as an advance test for the wipers 61, 62 and 63, which are set on the switch shaft in positions equivalent of one rotary position behind or lagging that of the wiper 71. In other words, when the wipers 61, 62 and 63 are resting on the first or number one set of bank terminals in a level, after a rotary step, the wiper 71 rests on the second or number two set of bank terminals.

There also is provided a magnet or electromagnet 91, rotary-off-normal springs 92, which are closed as soon as the first rotary step is made, a series resistance 93 and a grounded battery 94. Relays 95, 96, 97, 98 and 99 are mounted conventionally on the frame of the switch 10, which also has eleventh rotary step springs 89, vertical-off-normal springs 101, a rotary stepping magnet or relay 102 and a vertical stepping magnet or relay 103. The vertical stepping magnet is of well known construction and serves to step the shaft 60 by a well known ratchet connection (not shown).

The rotary stepping magnet 102 includes windings 100 and a well known armature 104 carrying a well known feed pawl 105 and a well known pawl guide 106 mounted adjustably on a bracket 107. The pawl guide 106 is adjusted to a position such that, when the windings 100 are energized and a sleeve 109 is retracted, the pawl 105 engages a ratchet tooth 108 on the shaft 60 and turns the shaft through a distance between two of the teeth 108, which moves the wipers 61, 62, 63 and 74 through the distance between two odd-numbered terminals 31, 32 and 45. This also moves the springs 71 and 75 from one even-numbered terminal 46 to the next even-numbered terminal 46. However, when the electromagnet 91 is energized, it pushes the sleeve 109 beyond the end of the guide 106, through an armature 110 having a forked end 118, a distance just sufficient that, when the rotary stepping magnet 102 is actuated, the pawl 105 misses the first tooth 108 and turns the shaft 60 only one position rather than two positions. That is, the wipers 71 and 75 go to the next odd-numbered terminal 45 and the wipers 61, 62, 63 and 74 go to the next even-numbered terminals 41, 42 and 46. Thus, with the magnet 91 deenergized, the rotary magnet 102 steps the shaft 60 two positions on each energization while, with the magnet 91 energized, the rotary magnet 102 steps the shaft only one rotary position on each energization.

In the operation, a receiver or handset 111 is lifted to make a hook switch 112 of the calling station 26 to connect the station 26 to a line finder 113. The line finder 113 is connected to switch 10, and thus extends a tip lead 114 and a ring lead 115 to the dial 25 and a sleeve lead 116 to the line finder 113 to hold it operated. The closed path through the dial contacts and station apparatus actuate the relay 97 through a grounded battery 120, a winding 121, a conductor 122, contacts 123 and 124 of the relay 95, the ring lead 115, a ring lead 118 of the station 26, the dial contacts, a tip lead 119 of the station 26, the tip lead 114, contacts 125 and 126 of the relay 95, a conductor 127, a second winding 117 of the relay 97, a conductor 129, contacts 130 and 131 and a conductor 132 connected to a grounded conductor 133 through a dial tone transformer 134 which gives a dial tone to the station 26. The windings 121 and 117 open contacts 141 and 142 and close contacts 141 and 143 to energize a winding 144 of the slow release relay 98 from a battery 145 grounded on one side through the contacts 143 and 141, conductors 146 and 147, contacts 148 of the relay 95 and a grounded conductor 150. The relay 98 pulls up to connect the sleeve lead 116 to ground through contacts 151 and conductors 187, 188 and 190, and moves a contact 152 out of engagement with a contact 153 and into engagement with a contact 154.

The subscriber at the station 26 then dials the first digit of the number of a station 161 to be called, and the dial 25 breaks and makes its contacts to alternately deenergize and energize the relay 97, the relay 98 staying in operated condition since it is a slow release relay. On each deenergization of the relay 97, the relay 99 and vertical magnet 103 are energized from a battery 162 through the contacts 154, 152, 142, 141 and 148 to ground. On each energization of the relay 97, the magnet 103 drops out but the relay 99 is a slow release relay and stays operated. On each operation of the magnet 103, it raises the shaft 60 one contact level, eventually to the contact level corresponding to the digit dialed. On the first operation of the magnet 103, a cam 171 on the shaft 60 permits contacts 172 and 173 of the vertical-off-normal springs 101 to close. The contacts 173 complete an energizing circuit to a winding 181 from a grounded battery 182, the contacts 173, a conductor 183, contacts 184 and 185 of the relay 99 and conductor 186 to the grounded contact 151 of the operated relay 98. The relay 96 closes contacts 203 and 204. The contacts 203 lock in the relay 96 through the contacts 173, conductors 183 and 205, contacts 206, the contacts 203, conductors 207 and 147 and the contacts 148.

On each succeeding impulse from the first digit dialed, the relay 97 is deenergized and energized to keep the relays 99 and 98, respectively, energized and to energize and deenergize the vertical stepping magnet 103. At the end of the dial impulses of the first digit, the dial contacts reclose so that the relay 97 is energized to deenergize the relay 99 and magnet 103 which drop out. The contacts 184 and 185 open and contacts 185 and 215 close to energize the rotary stepping magnet 102, through a grounded battery 216, the winding 100, conductors 222 and 223, the contacts 204, 215 and 185, conductor 186 and contact 151 to ground. The magnet 102 opens the contacts 206 to deenergize the relay 96 and also steps the wiper springs 61, 62, 63 and 74 a two position step to the odd-numbered terminals 31, 32 and 45 of the level of the banks to which the wiper springs have been stepped and the springs 71 and 75 to the even-numbered terminal 46. Opening of the contacts 206 of the magnet 102 drops out the relay 96, which in turn, opens the contacts 204 to drop out the rotary stepping magnet 102.

If the first terminals 31, 32 and 45 connected to the first trunk 16 are not busy, the conductor 17 and the contact 45 are not at ground potential and there is no ground from the sleeve wiper spring 63 and the contact 45 to the bottom end of a winding 280 of the relay 95. This causes energization of the relay winding 280 from the battery 182 through the winding 181 of the relay 96, a conductor 239, the contacts 173 of the vertical-off-normal springs 101, the conductors 183 and 205, the contacts 206, conductors 238, 237 and 225, the winding 280, conductor 226, contacts 286 and 287 of the springs 89, conductors 288, 188 and 187 and contact 151 of the relay 98 to ground. The winding 280 is a high ampere-turn winding while the winding 181 of the relay 96 is a low ampere-turn winding so that the relay 95 is actuated at this time while the relay 96 is not energized sufficiently to pull up. The relay 95 then makes contacts 124 and 295 to connect the ring conductor 115 to the ring conductor 19 through the contacts 124 and 295, a conductor 128, the ring wiper spring 62 and the ring terminal 32. The relay 95 also makes contacts 125 and 296 to connect the tip conductor 114 to the tip conductor 18 through the contacts 125 and 296, a conductor 230, the tip wiper spring 61 and the tip terminal 31. The first trunk 16 connects the subscribers station 26 to successive selector switch groups 304, which operate in the same manner as the selector switch 10 to connect the station 26 to a connector switch 305, which connects the station 26 to the station 161, all upon further dialing, of course. The sleeve conductor 116 is connected to the sleeve conductor 17 through conductors 190, 188 and 310, contacts 297 and 234 of the relay 95, a conductor 275, the sleeve wiper spring 63 and the sleeve terminal 45 to hold the line finder equipment operated from holding ground furnished by the succeeding switches in the train to the sleeve terminal 45. This holding ground also holds relay 95 energized for the duration of the call from battery 182 through the winding 181 of the relay 96, a conductor 239, the contacts 173 of springs 101, the conductors 183 and 205, the contacts 206, conductors 238, 237 and 225, the winding 280, conductor 226, contacts 286 and 287 of springs 89, conductors 288, 188 and 310, contacts 297 and 234 of relay 95, a conductor 275, the sleeve wiper spring 63 and the sleeve terminal 45 to holding ground from the succeeding switches. When relay 95 is energized, its contacts 124 and 123 and contacts 125 and 126 are opened so as to deenergize relay 97, which releases and opens its contacts 141 and 143 to deenergize relay 98. Contacts 234 and 235 of the relay 95 are open to prevent further actuation of the relay 96, thereby preventing operation of the rotary magnet 102, and the contacts 148 of the relay 95 are held open to set up the release magnet circuit. Contacts 242 open the connection to the advance test wipers 71 and 75 so as not to disturb the functioning of the circuits that may be connected to bank terminal 46 by other selector switches through the multiple bank wiring. When the switch hook 112 of the station 26 and a corresponding switch hook 318 of the station 161 are opened again the line finder 113 and the switches 10, 304 and 305 are dropped back to normal.

When the trunk 12 connected to the first or number two terminals 41, 42 and 46 of the level of the banks 27 and 28 being contacted is busy, the advance test wiper 71 connects to ground a previously ungrounded side of a winding 241 of the magnet 91 through a conductor 239, contacts 242 of the relay 95 and conductors 243 and 244 to prevent the magnet 91 from being operated by the rotary-off-normal springs 92 which closed on the first horizontal or rotary step to connect the winding to the battery 94 through the resistor 93, the other side of the winding 241 being grounded. If the first terminals 31, 32 and 45 are busy, and if the first terminal 46 being contacted also is busy, the sleeve terminal 45 is previously grounded to reenergize the relay 96 through a conductor 275, contacts 234 and 235 of the relay 95, conductors 236, 237 and 238, the contacts 206 of the magnet 102, conductors 205 and 183, contacts 173, a conductor 239, the winding 181 and the grounded battery 182. The relay 96 pulls up fast and reenergizes the rotary stepping magnet 102 to again step the shaft 60 one full step or two rotary positions.

Figure 5:
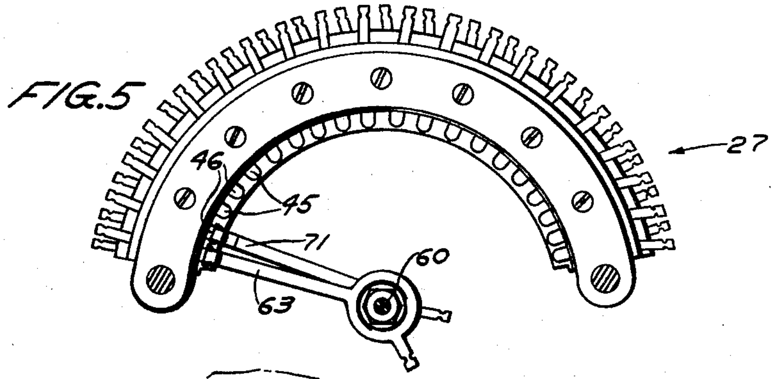
Fig. 5 is a horizontal section taken along line 5—5 of Fig. 2.
Figure 6:
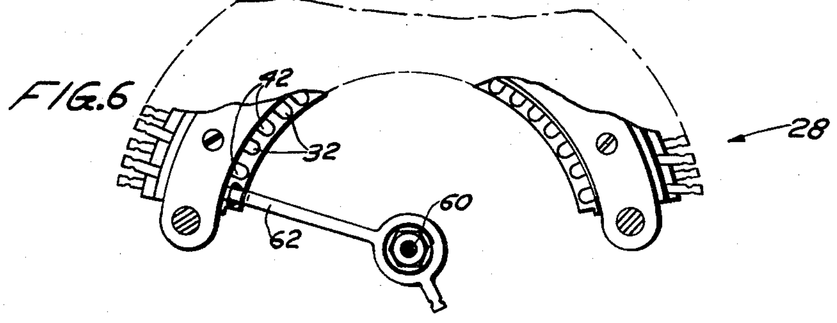
Fig. 6 is a horizontal section taken along line 6—6 of Fig. 2.
Figure 3:
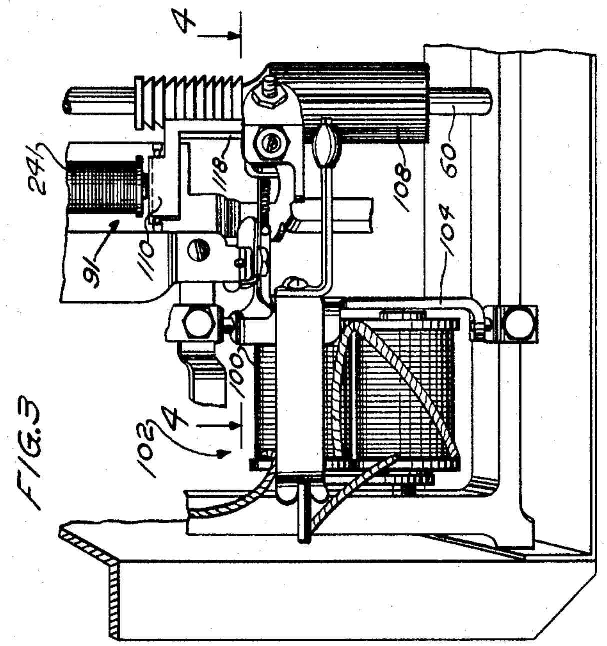
Fig. 3 is a fragmentary, front elevation of a portion of the switch shown in Fig. 2.
Figure 4:
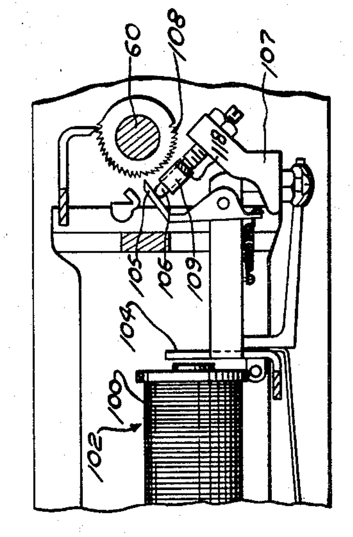
Fig. 4 is a horizontal section taken along line 4—4 of Fig. 3.
Figure 7:
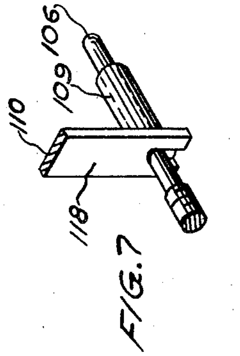
Fig. 7 is an enlarged, fragmentary perspective view of a portion of the switch.

If the sleeve conductor 13 connected to the first even-numbered terminal 46 of the level were not grounded, thereby indicating that the trunk 12 is open, the advance test wiper 71 does not ground the battery side of the winding 241 of the magnet 91, and it is operated by the battery 94 to slide the sleeve 109 (Fig. 5) out beyond the end of the pawl guide 106. Then the rotary magnet 102 steps the wipers 61, 62, 63 and 74 one-half step or one rotary position to the open terminals 41, 42 and 46.

Then, assuming that, in the short period of time between the contact of the trunk 12 by the advance or pretest wiper 71 and the contact of that trunk by the wipers 61, 62 and 63, the trunk was not seized by another selector switch competing with the switch 10, the switch 10 seizes this open trunk since then the conductor 13 and the contact 46 are not at ground potential and there is no ground from the sleeve wiper spring 63 and the contact 46 to the bottom end of a winding 280 of the relay 95. The winding 280 of the relay 95 is energized by the battery 182 through the winding 181 of the relay 96, the conductor 239, contacts 173, conductors 183 and 205, contacts 206, conductors 238, 237 and 225, the winding 280, conductor 226, contacts 286 and 287 of the springs 89 and conductors 288, 188 and 187 and contact 151 of the relay 98 to ground. The relay 95 closes contacts 124 and 295, 125 and 296, 234 and 297, and opens contacts 123 and 124, 125 and 126, 234 and 235, 148 and 242. The contacts 124 and 125 connect the ring and tip wiper springs 62 and 61 to the ring and tip leads 115 and 114 to complete the connection to the trunk 12 for dialing the next digit to the seized selector switch of the next group of the groups of selector switches 304, and the connector switch 305, on the last digit dialed, connects the station 26 to the station 161.

Assuming that all ten even-numbered trunks 12 in the level dialed would be busy, the grounded equivalent sleeve terminal 46 would provide ground through the pretest wiper 71 to short out the winding of the magnet 91, which has ground on its other side. This short would prevent the magnet 91 from operating when battery is applied through the resistance 93 and the rotary-off-normal springs 92 after the first rotary step. Thus, the magnet 91 would be prevented from operating during the first ten full rotary steps and the switch 10 would perform its hunting function in the regular manner over the trunks 16. If in this case all ten trunk terminals 31, 32 and 45 are busy, the switch 10 rotates to the eleventh full position to actuate the eleventh rotary step springs 89 and busy tone will be provided in from a busy tone source 321 through a conductor 322, contacts 325 and 130 of the springs 89, conductors 129 and 127, contacts 126 and 125 and the conductors 114 and 119.

Whenever the terminals 31, 32 and 45 are busy at any horizontal step and the corresponding terminals 41, 42 and 46 are not busy, the relay 96 will be reoperated and relocked for another rotary step from grounded terminal 45 of the bush trunk. However, before the rotary step occurs, the wiper 71 resting on an idle trunk terminal 46 will not have a shunting ground supplied therefrom and thus will permit the magnet 91 to operate this time from the battery 94 through the resistance 93, the rotary-off-normal springs 92, conductor 244, and winding 241 of the relay 95 to ground. The magnet 91 will then hold in until the one position, or half step is made. When the one-half or one position rotary step now takes place, the wipers 61, 62 and 63 will re-test and seize the trunk 12 already pretested by the advance test wiper 71 since they are one step behind the position of the wipers 71 and 75.

Assuming next that all ten odd-numbered trunks 16 in the level are busy but only the first nine trunks 12 are busy, the magnet 91 will operate, as described above, due to the idle and ungrounded tenth even-numbered terminal 46 or twentieth terminal in the level just prior to the eleventh rotary step. The connection to the tenth even-numbered trunk 12 in the level will be completed as above on the eleventh rotary step which in this case will be a half step and thus will not operate the eleventh-rotary-step springs 89.

Assuming that all twenty trunks 12 and 16 are busy, the magnet 91 will have remained unoperated through the tenth and eleventh rotary steps and thus the eleventh rotary step springs 89 become effective in their regular manner to connect the busy signal to the station 26. Where the switch 10 has found all ten trunks 16 to be busy, the tenth trunk 12 to be open and has rotated to the eleventh rotary half step position to seize the tenth trunk 12 and that trunk 12 has just been seized by another switch hunting through the level simultaneously under heavy traffic conditions during the interval between the pretest of the tenth trunk 12 by the wiper 71 in the tenth full rotary step position and the retest of the same trunk by the wiper 63 in the eleventh rotary half step position, the switch 10 will find the tenth trunk 12 busy and thus will rotate the wipers another half step to the eleventh rotary full step position, at which time the eleventh rotary step springs 89 are operated to establish an all paths busy condition back to the calling subscriber 26, and to prevent cut-through of the wipers 61, 62 and 63. These functions are effected as follows: with all the trunks 16 and the first nine of the trunks 12 busy, the switch 10 in the tenth rotary step position operates and locks the relay 96 for the eleventh rotary step and also operates the magnet 91 to halve the eleventh rotary step. However, if on arriving on the tenth trunk 12, the wiper 63 finds that this trunk had just been seized by another switch during this rotary step, ground on the bank terminal 46 of the trunk 12 reoperates the relay 96 which relocks in the regular manner. The magnet 91 in this case, however, will remain operated, since the advance test wiper 71 will have passed beyond the last terminal in the level, and therefore, the shunting ground for the magnet 91 will be absent. The rotary action will thus result in a final half step to the full eleventh rotary step position in which position the eleventh rotary step springs 89 are operated to give the calling subscriber the all paths busy signal and to prevent the wiper-cut-through relay 95 from operating.

In the operation, the wiper springs 61, 62 and 63 test at each odd-numbered position, and the pretest wiper 71 tests simultaneously therewith at each even-numbered position. If the wiper spring 63 is contacting an open trunk, the relay 95 is energized which prevents further operation of relay 96 and it in turn prevents the operation of the rotary stepping magnet 102. The relay 95 opens contacts 242 to prevent interference of the advance test wiper with calls on the adjacent terminals and the call is cut through to the next one of the selector switches 304.

If the wiper spring 63 is contacting a busy trunk 45, it is grounded thereby to actuate rapidly the relay 96 to actuate the rotary stepping magnet 102. If the pretest wiper 71 is contacting a busy trunk 46, the magnet 91 is kept grounded on its power side and remains deenergized. But, if the pretest wiper 71 is contacting an open trunk 46, the trunk 46 being ungrounded removes ground from the power side of the magnet 91, which pulls up, and the fast operating rotary stepping magnet 102 steps the wiper spring set one-half step to the next half position. The call then goes through the wiper springs 61, 62 and 63 to the next one of the selector switches 304. Since the pretest wiper 71 tests simultaneously with the test by the wiper 63, there is no delay from testing for the second set of wipers, and the rotary stepping operations are not slowed at all even through two testing operations occur at each position.

If during a half step or one position after an open trunk 12 is encountered by the pretest wiper 71, another competing selector switch seizes that trunk 12, the switch 10 continues to hunt with two position steps but with the wiper 71 hunting on the terminals 45 and the wiper 63 hunting on the alternate terminals 46.

The above-described system is highly efficient, and utilizes a minimum amount of equipment for a given load. The switches themselves are rugged and compact and require minimum maintenance.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. In a telephone system, a group of trunk lines, a wiper set for searching over the group of trunk lines for connection with an open one thereof, a pretest wiper movable over the group of trunk lines one position in advance of the wiper set to hunt for an open trunk line, means for moving the wiper set and the pretest wiper over the lines, and means operable by the pretest wiper after it finds an open trunk line for stopping the moving means one position later and connecting the wiper set to the open trunk line.

2. A step-by-step switch, which comprises a first group of trunk terminals, a second group of trunk terminals, wiper means for searching over the first set of trunk terminals, means for moving the wiper means step-by-step over the first group of trunk terminals, pretest wiper means movable by the moving means over the second group of trunk terminals one position in advance of the first wiper means for searching over the second group of trunk terminals simultaneously with the searching of the first wiper means, and means operable by the pretest wiper means when it is in contact with an open trunk terminal and the first wiper means is in contact with a busy trunk terminal for shifting the first wiper means into contact with said open trunk.

3. A step-by-step switch, which comprises a first group of trunk terminals, a second group of trunk terminals spaced alternately with the terminals of the first group, wiper means for searching over the trunk terminals, means for moving the wiper means step-by-step over the first group of trunk terminals, pretest wiper means movable by the moving means over the second group of trunk terminals one position in advance of the first wiper means for searching over the second group of trunk terminals simultaneously with the searching of the first wiper means, and means operable by the pretest wiper means when it is in contact with an open trunk terminal and the first wiper means is in contact with a busy trunk terminal for shifting the first wiper means into contact with said open trunk.

4. A step-by-step switch, which comprises a group of trunk terminals, wiper means for searching over the trunk terminals, means for moving the wiper means in two-position steps over the trunk terminals, pretest wiper means movable by the moving means in two-position steps over the trunk terminals one position in advance of the first wiper means for searching over the trunk terminals simultaneously with the searching of the first wiper means, means for shifting the moving means from two-position stepping to one-position stepping, and means operable by the wiper means when the pretest wiper is in contact with an open trunk terminal and the first wiper means is in contact with a busy trunk terminal for actuating the shifting means to cause the moving means to shift the first wiper means one position into contact with said open trunk.

5. A step-by-step switch, which comprises a group of trunk terminals, a set of wipers, a pretest wiper one position in advance of the set of wipers, stepping means normally operable for moving the pretest wiper and the set of wipers in two-position steps, said stepping means being actuatable to move the pretest wiper and the set of wipers in a one-position step, and means operable by contact with the set of wipers with a busy trunk terminal and simultaneous contact of the pretest wiper with an open terminal of the trunk terminals for actuating the stepping means to make a one-position step.

6. A step-by-step switch, which comprises a group of trunk terminals, a set of wipers, a pretest wiper one position in advance of the set of wipers, stepping means normally operable for moving the pretest wiper and the set of wipers in two-position steps so that the set of wipers is moved from one terminal to the second terminal therefrom and the pretest wiper is moved one terminal position in advance thereof, said stepping means also being actuatable to move the pretest wiper and the set of wipers in a one-position step, means operable by contact with the set of wipers with a busy terminal and simultaneous contact of the pretest wiper with an open terminal one step in advance of said busy terminal for actuating the stepping means to make a one-position step, means operable by contact of the set of wipers with a busy trunk terminal at the end of said one-position step for actuating the stepping means to make a two-position step, and means for isolating the pretest wiper when the set of wipers engage open trunk terminals.

7. A step-by-step switch, which comprises a first group of trunk terminals, a second group of trunk terminals each positioned alternately with one of the first group of trunk terminals, a set of wipers, a pretest wiper one position in advance of the set of wipers, stepping means normally operable for moving the pretest wiper and the set of wipers in two-position steps so that the set of wipers is moved from terminal to terminal of the first group and the pretest wiper is moved from terminal to terminal of the second group, said stepping means being actuatable to move the pretest wiper and the set of wipers in a one-position step to step the set of wipers into engagement with the trunk terminals of the second group just previously contacted by the pretest wiper, and means operable by contact with the set of wipers with a busy terminal of the first group of terminals and simultaneous contact of the pretest wiper with an open terminal of the second group of trunk terminals for actuating the stepping means to make a non-position step.

8. A step-by-step switch, which comprises a first group of trunk terminals, a second group of trunk terminals each positioned alternately with one of the first group of trunk terminals, a set of wipers, a pretest wiper one position in advance of the set of wipers, stepping means normally operable for moving the pretest wiper and the set of wipers in two-position steps so that the set of wipers is moved from terminal to terminal of the first group and the pretest wiper is moved from terminal to terminal of the second group, said stepping means being actuatable to move the pretest wiper and the set of wipers in a one-position step to step the set of wipers into engagement with the trunk terminals of the second group just previously contacted by the pretest wiper, means operable by contact with the set of wipers with a busy terminal of the first group of terminals and simultaneous contact of the pretest wiper with an open terminal of the second group of trunk terminals for actuating the stepping means to make a one-position step, means operable by contact of the set of wipers with a busy trunk terminal of the second group of trunk terminals at the end of said one-position step for actuating the stepping means to make a two-position step, and means for isolating the pretest wiper when the set of wipers engage open trunk terminals.

9. A two-position stepping selector switch, which comprises a bank of sleeve terminals having a plurality of levels, each of said levels having its terminals alternating between odd-numbered terminals and even-numbered terminals, a bank of pairs of tip terminals and ring terminals having a plurality of levels, each of said levels having its pairs of tip and ring terminals alternating between odd-numbered pairs and even-numbered pairs, drive means vertically movable and horizontally movable, a wiper set carried by the drive means and including a test wiper for engaging the sleeve terminals, said wiper-set also having a ring wiper for engaging the ring terminals and a tip wiper for engaging the tip terminals, a pretest wiper carried by the drive means at the same level and one position in advance of the test wiper, means for stepping the drive means vertically, means normally operable for stepping the drive means horizontally in two position steps, means for limiting the horizontal stepping means to step the drive means horizontally one position, and means operable when the test wiper engages a busy trunk terminal and the pretest wiper engages an open trunk terminal to actuate the limiting means.

10. A two-position stepping selector switch, which comprises a sleeve terminal level having its terminals alternating between odd-numbered terminals and even-numbered terminals, a tip and ring terminal level having pairs of tip and ring terminals alternating between odd-numbered pairs and even-numbered pairs, drive means horizontally movable, a wiper set carried by the drive means and including a test wiper for engaging the sleeve terminals, said wiper-set also having a ring wiper for engaging the ring terminals and a tip wiper for engaging the tip terminals, a pretest wiper carried by the drive means at the same level and one position in advance of the test wiper, means for stepping the drive means horizontally in two-position steps, means for limiting the stepping means to a one-position step, and means operable when the test wiper engages a busy trunk terminal and the pretest wiper engages an open trunk terminal to actuate the limiting means.

11. A two-position stepping selector switch, which comprises a bank of sleeve terminals having a plurality of levels, each of said levels having its terminals alternating between odd-numbered terminals and even-numbered terminals, a bank of pairs of tip terminals and ring terminals having a plurality of levels, each of said levers having its pairs of tip and ring terminals alternating between odd-numbered pairs and even-numbered pairs, drive means vertically movable and horizontally movable, a wiper set carried by the drive means and including a test wiper for engaging the sleeve terminals, said wiper-set also having a ring wiper for engaging the ring terminals and a tip wiper for engaging the tip terminals, a pretest wiper carried by the drive means at the same level and one position in advance of the test wiper, means for stepping the drive means vertically, pawl-and-ratchet means normally operable to step and drive means horizontally in two position steps, means for limiting the pawl-and-ratchet means to step the drive means horizontally a one position, means operable when both the test wiper engages a busy trunk terminal and the pretest wiper engages an open trunk terminal to actuate the limiting means, and means for isolating the pretest wiper electrically when the test wiper engages an open trunk terminal.

12. A two-position stepping selector switch, which comprises a bank of sleeve terminals having a plurality of levels, each of said levels having its terminals alternating between odd-numbered terminals and even-numbered terminals, a bank of pairs of tip terminals and ring terminals having a plurality of levels, each of said levels having its pairs of tip and ring terminals alternating between odd-numbered pairs and even-numbered pairs, vertically movable and horizontally movable drive means, a wiper set carried by the drive means and including a test wiper for engaging the sleeve terminals, said wiper-set also having a ring wiper for engaging the ring terminals and a tip wiper for engaging the tip terminals, a pretest wiper carried by the drive means at the same level and one position in advance of the test wiper, means for stepping the drive means vertically, pawl-and-ratchet means, a pawl guide normally operable to permit the pawl-and-ratchet means to step the drive means horizontally in a two-position step on each actuation of the pawl-and-ratchet means, means for actuating the pawl-and-ratchet means whenever the test wiper engages a busy terminal, means for shifting the pawl guide to permit the pawl-and-ratchet means to step the drive means horizontally only one position, means operable when both the test wiper engages a busy trunk terminal and the pretest wiper engages an open trunk terminal to actuate the limiting means, and means for isolating the pretest wiper electrically when the test wiper engages an open trunk terminal.

13. A step-by-step switch, which comprises a group of trunk terminals, a set of wipers, a pretest wiper one position in advance of the set of wiper, pawl-and-ratchet stepping means normally operable for moving the pretest wiper and the set of wipers in two-position steps so that the wipers are moved from each terminal to the second terminal therefrom, a pawl guide means operable when actuated to limit the stepping means to a one-position step of the pretest wiper and the set of wipers, means operable by the set of wipers when in contact with busy terminals to actuate the stepping means, means operable by contact with the set of wipers with busy terminals and simultaneous contact of the pretest wiper with an open terminal for actuating the pawl guide means to limit the stepping means to a one-position step, means operable by contact of the set of wipers with busy trunk terminals at the end of said one-position step to actuate the stepping means to make a two-position step, and means for isolating the pretest wiper when the set of wipers engage open trunk terminals.

References Cited in the file of this patent

UNITED STATES PATENTS

| | | |
|---|---|---|
| 1,251,752 | Clausen et al. | Jan. 1, 1918 |
| 1,252,466 | McQuarrie et al. | Jan. 8, 1918 |
| 1,465,258 | French | Aug. 21, 1923 |
| 1,475,497 | Lundquist | Nov. 27, 1923 |
| 1,638,397 | Hall | Aug. 9, 1927 |
| 1,669,368 | Allendorff | May 8, 1928 |
| 1,725,044 | Allendorff | Aug. 25, 1929 |
| 1,922,192 | Bellamy | Aug. 15, 1933 |

UNITED STATES PATENT OFFICE

CERTIFICATE OF CORRECTION

Patent No. 2,935,570 May 3, 1960

Robert B. Sladek

It is hereby certified that error appears in the printed specification of the above numbered patent requiring correction and that the said Letters Patent should read as corrected below.

Column 9, line 18, for "non-position" read -- one-position --; column 10, line 25, for "and" read -- the --.

Signed and sealed this 25th day of October 1960.

(SEAL)
Attest:

KARL H. AXLINE
Attesting Officer

ROBERT C. WATSON
Commissioner of Patents